(12) United States Patent
Sanchez

(10) Patent No.: US 7,703,215 B1
(45) Date of Patent: Apr. 27, 2010

(54) FLANGE ALIGNMENT TOOL

(76) Inventor: Alfredo Rangel Sanchez, P.O. Box 5623, Corpus Christi, TX (US) 78465

( * ) Notice: Subject to any disclaimer, the term of this patent is extended or adjusted under 35 U.S.C. 154(b) by 555 days.

(21) Appl. No.: 11/724,368

(22) Filed: Mar. 15, 2007

Related U.S. Application Data

(60) Provisional application No. 60/852,456, filed on Oct. 18, 2006.

(51) Int. Cl.
*G01B 5/25* (2006.01)
*B23P 19/04* (2006.01)

(52) U.S. Cl. ............................... 33/645; 33/520; 33/533

(58) Field of Classification Search ........... 33/644–645, 33/613, 520, 529, 533, 542–543, 544.4; 29/271, 29/464, 466, 467, 468
See application file for complete search history.

(56) References Cited

U.S. PATENT DOCUMENTS

| | | | | |
|---|---|---|---|---|
| 3,015,883 A | * | 1/1962 | Brown | .......................... 29/271 |
| 3,822,481 A | * | 7/1974 | Doan | ........................... 33/371 |
| 4,662,055 A | * | 5/1987 | VanMeter | ...................... 29/467 |
| 4,986,574 A | | 1/1991 | Beckman | |
| 5,004,017 A | * | 4/1991 | White | .......................... 29/464 |
| 5,074,536 A | | 12/1991 | McConkey | |
| 5,094,435 A | * | 3/1992 | Depperman et al. | ........... 269/43 |
| 5,228,181 A | * | 7/1993 | Ingle | ........................... 29/272 |
| 5,560,091 A | * | 10/1996 | Labit, Jr. | ....................... 29/272 |
| 5,799,408 A | | 9/1998 | Sprayberry | |
| 6,058,588 A | * | 5/2000 | Wadensten | .................. 29/426.5 |
| 6,568,712 B1 | | 5/2003 | Aaron | |
| 6,955,224 B2 | | 10/2005 | Watson | |

\* cited by examiner

*Primary Examiner*—Yaritza Guadalupe-McCall
(74) *Attorney, Agent, or Firm*—George S. Gray

(57) ABSTRACT

A flange alignment tool is provided for aligning misaligned flanges such that one worker can align the flanges, in a safe and efficient manner, with no sledge hammer involved. The flange alignment tool is simple to operate and is adaptable to various sized flange holes. The tool is operated by simple tools, such as a wrench, with no impact forces required. The tool is constructed of rigid materials to provide the strength and support for the alignment process, and has all components attached, and readily accessible, that are needed to accommodate various sizes of flange holes.

12 Claims, 6 Drawing Sheets

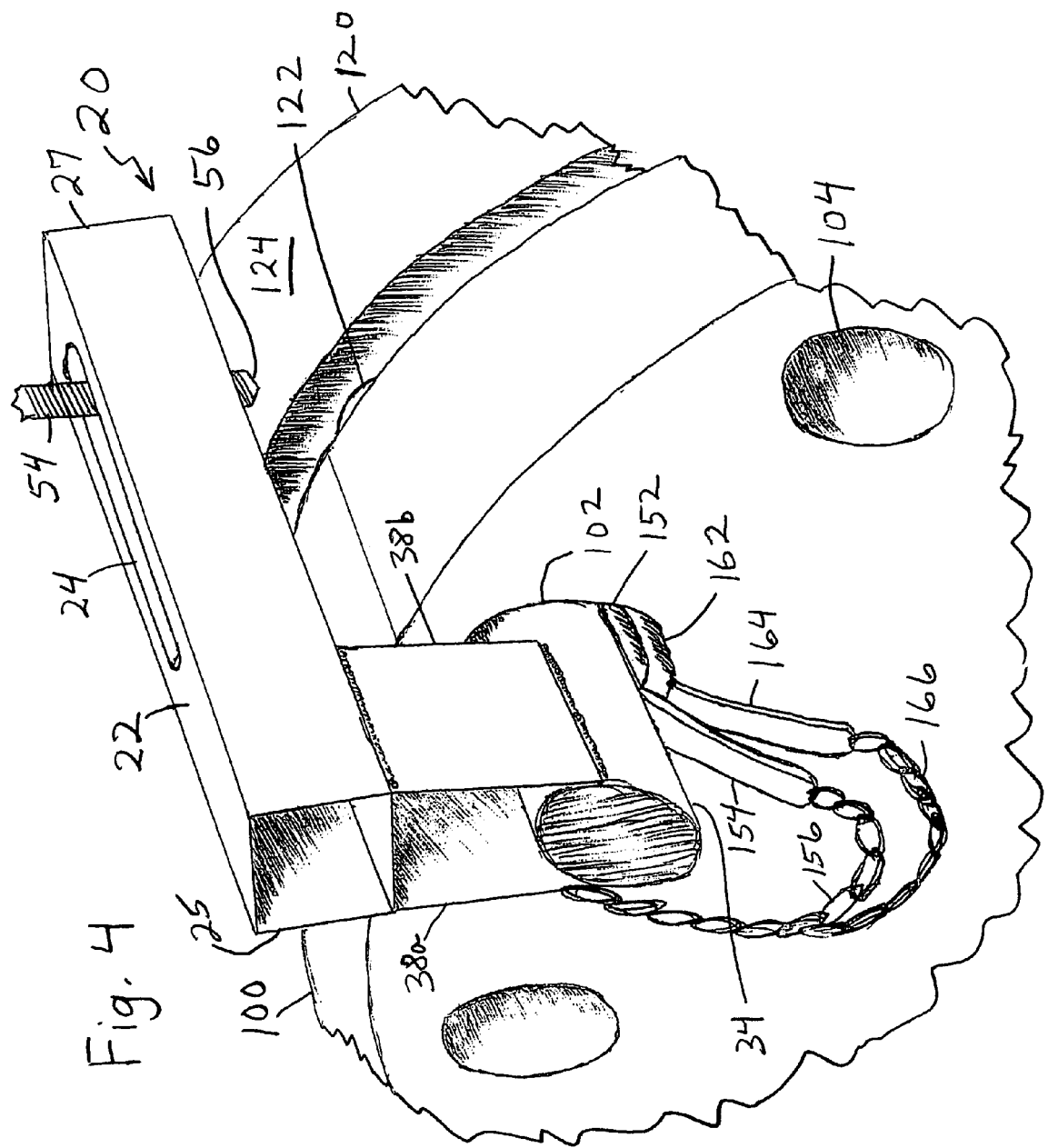

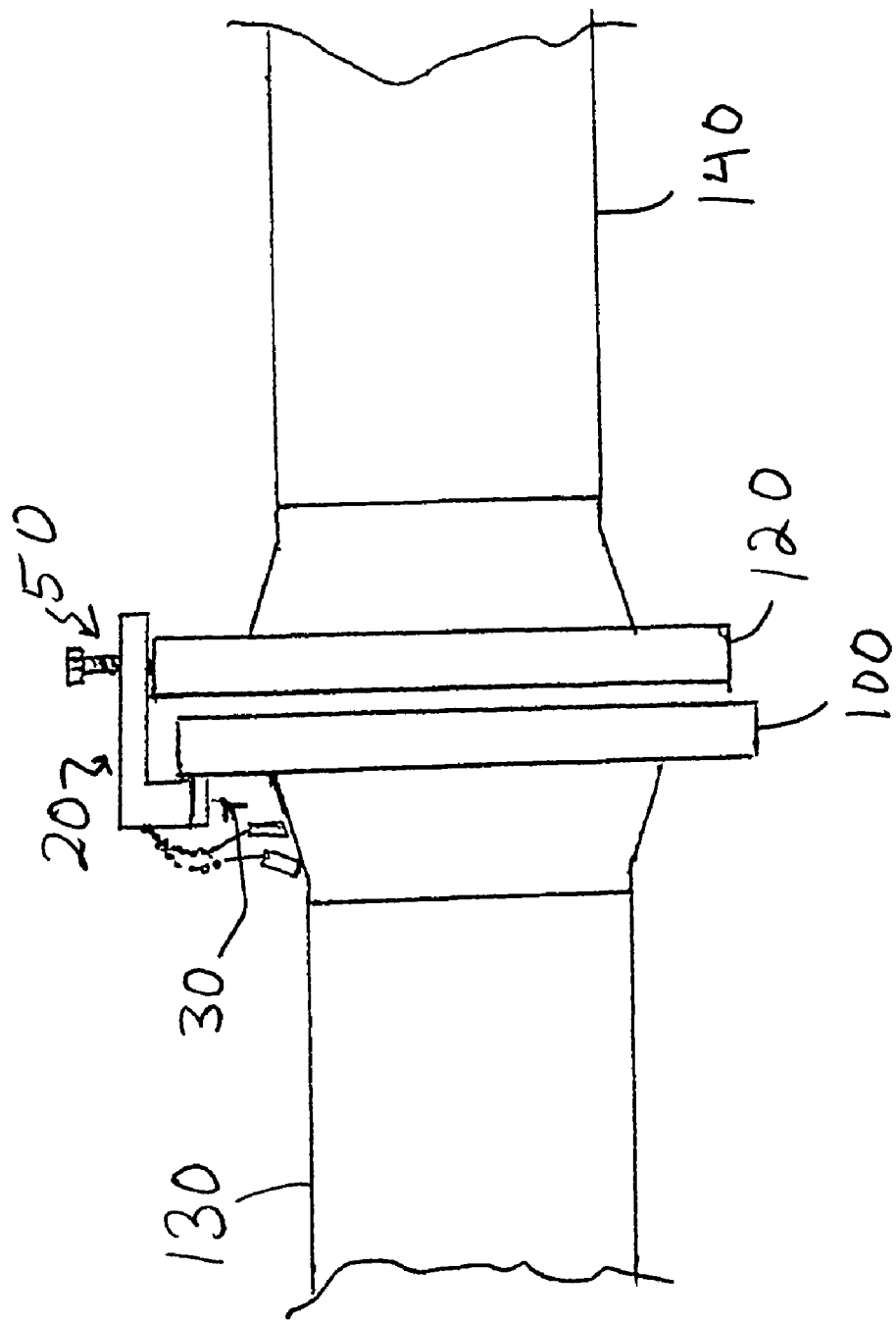

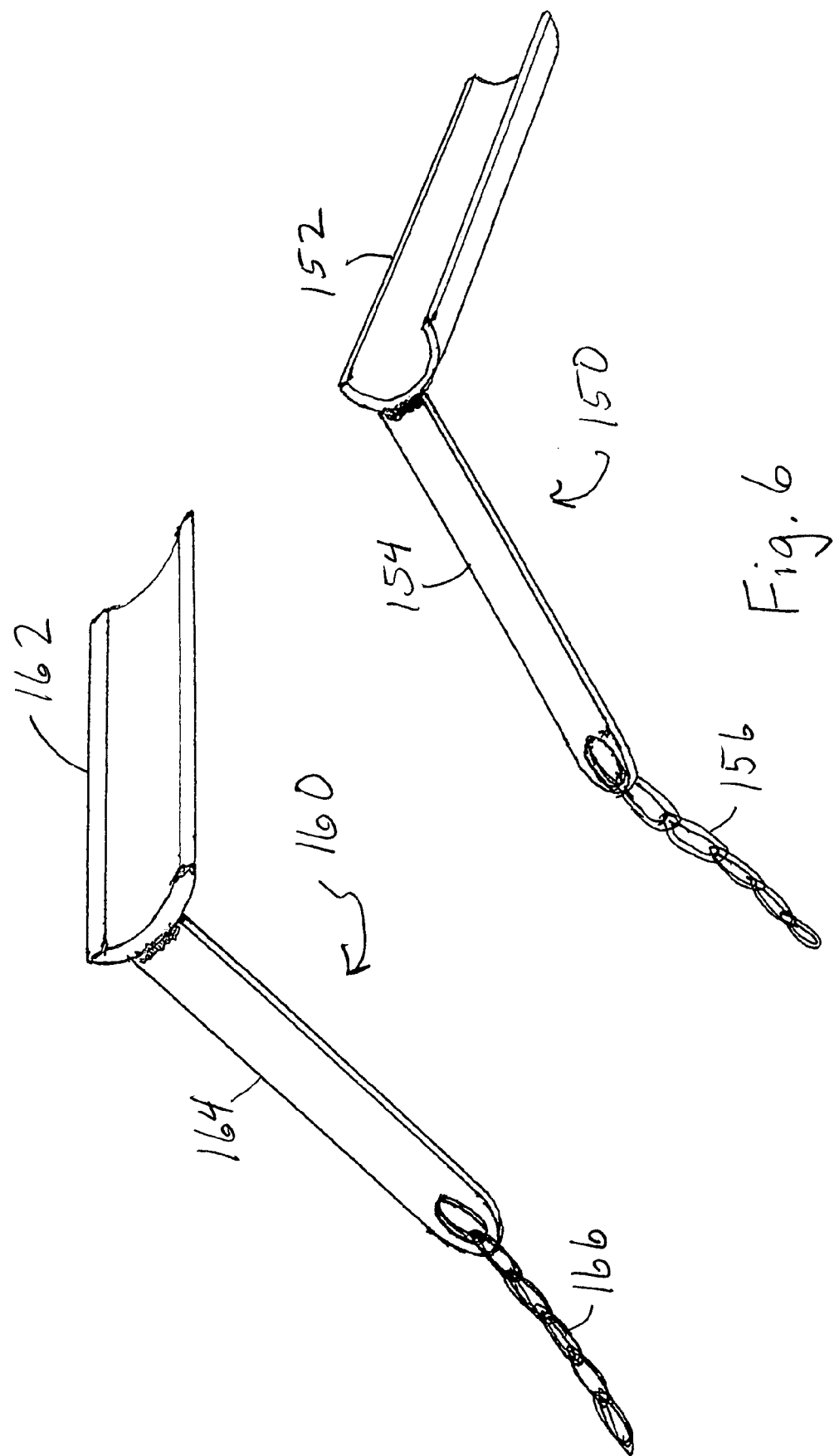

FLANGE ALIGNMENT TOOL

CROSS-REFERENCE TO RELATED APPLICATION

This application claims priority from U.S. Provisional Patent Application Ser. No. 60/852,456, filed Oct. 18, 2006, by the inventor herein, Alfredo Rangel Sanchez.

BACKGROUND OF THE INVENTION

1. Field of the Invention

The field of the invention is industrial piping equipment, specifically flange joints used for connecting sections of pipe, valves, and the like.

2. Description of Related Art

Industrial workers often face the task of connecting two pipe sections, or a valve and a pipe section, where each pipe section and valve has a flange on its end. The flanges are matched and have a number of corresponding hole pairs such that bolts may be inserted through the hole in the first flange and through the corresponding hole in the second flange. A nut is then added to the bolt portion that protrudes from the hole in the second flange. All corresponding hole pairs receive a bolt and nut in this manner, and the flange joint is finally connected by tightening the nuts on the bolts.

In order to begin this task, the worker must first line up a pair of corresponding holes on the first and second flanges. Since the pipe, valves, and flanges are usually very heavy and awkward, it is hard to align the corresponding holes to receive the first bolt. In current practice, the worker uses a "line-up pin", which is a steel pin that must be driven into the corresponding hole pair with a sledge hammer. The force of the sledge hammer acting on the pin will eventually move the flanges into approximate alignment, and a bolt may be placed in another of the corresponding hole pairs.

The line-up pin technique has serious shortcomings. Often the workers are in small areas with insufficient room to properly aim and swing the sledge hammer. As a result, the worker holding the pin is often struck in the arm or hand by the hammer. Also, surrounding structures, such as the valve bodies, are often inadvertently struck by the hammer. A sledge hammer striking the steel pin is also very loud, especially when working in metal buildings.

What is needed is a device for aligning misaligned flanges in a simple operation such that one worker can align the flanges, in a safe and efficient manner, with no sledge hammer or other impact forces involved.

SUMMARY OF THE INVENTION

My invention overcomes the shortcomings of the prior art by providing a flange alignment tool for aligning misaligned flanges such that one worker can align the flanges, in a safe and efficient manner, with no sledge hammer involved. My flange alignment tool is simple to operate and is adaptable to various sized flange holes. The tool is operated by simple tools, such as a wrench, with no impact forces required. The tool is constructed of rigid materials to provide the strength and support for the alignment process, and has all components attached, and readily accessible, that are needed to accommodate various sizes of flange holes.

In the present invention, I have provided a tool for aligning misaligned bolt holes in first and second flanges, the flanges having top edges and holes, including top holes, for receiving bolts, such that the first and second flanges can be drawn together, the tool comprising: an insertion member for inserting into the top hole of the first flange; a body member, attached to the insertion member, for positioning on the second flange and extending over the first flange; a sliding member slidably positioned within the body member; and an elongated member positioned through the body member, threadably received by the sliding member, and slidable along the body member with the sliding member to a point above the second flange top edge, such that rotation of the elongated member in a first direction causes the elongated member to bear upon the second flange top edge and move the body member, the movement of the body member causing the insertion member to move the first flange toward a more aligned position.

In some exemplary embodiments, the tool further comprises a shim for reducing the annulus formed by the insertion member in the first flange top hole. In some exemplary embodiments, the tool further comprises an attachment member for attaching the shim to the tool.

In some exemplary embodiments, the tool further comprises a plurality of shims, having varying thicknesses, for reducing the annulus formed by the insertion member in the first flange top hole. In some exemplary embodiments, the tool further comprises an attachment member for attaching the shim to the tool.

In some exemplary embodiments, the first flange top hole has an interior end and the insertion member has a first end, the body member and insertion member being configured such that, when inserted into the first flange top hole, the body member bears upon the first flange and the insertion member first end is proximate the first flange top hole interior end.

I have provided, in the present invention, a tool for aligning misaligned bolt holes in first and second flanges, the flanges having top edges and holes, including top holes, for receiving bolts, such that the first and second flanges can be drawn together, the tool comprising: support means for supporting the first flange at the first flange top hole; lift means, cooperating with the second flange top edge, for lifting the support means; positioning means for positioning the lift means for cooperation with the second flange top edge; and operating means, for operating the lift means.

In some exemplary embodiments, the tool further comprises fitting means for improving the support means support of the first flange at the first flange top hole.

In the present invention, I have provided a tool for aligning misaligned bolt holes in first and second flanges, the flanges having top edges and holes, including top holes, for receiving bolts, such that the first and second flanges can be drawn together, the tool comprising: a body member, the body member having a bore, a top and a bottom, the top having a slot, the bottom having a slot, the top and bottom slots being at least partially aligned; a rod, attached to the body member, the rod being in substantial parallel alignment with the top slot; and a slide member, positioned for movement along the body member bore, the sliding member having a threaded member, the sliding member having a hole for threadably receiving the threaded member, the threaded member being positioned through the body member top slot, through the sliding member hole, then through the body member bottom slot; such that, when the rod is inserted into the first flange top hole, the body member extends over the second flange top edge, and rotation of the threaded member causes the body member to rise and lift the rod, the rod lifting the second flange.

In some exemplary embodiments, the tool further comprises a shim for reducing the annulus formed by the rod in the first flange top hole. In some exemplary embodiments, the tool further comprises an attachment member for attaching the shim to the tool.

In some exemplary embodiments, the tool further comprises a plurality of shims, having varying thicknesses, for reducing the annulus formed by the rod in the first flange top hole. In some exemplary embodiments, the tool further comprises an attachment member for attaching the shim to the tool.

In some exemplary embodiments, the first flange top hole has an interior end and the rod has a first end, the body member and rod being configured such that, when inserted into the first flange top hole, the body member bears upon the first flange and the rod first end is proximate the first flange top hole interior end.

The foregoing features and advantages of my invention will be apparent from the following more particular descriptions of exemplary embodiments of the invention as illustrated, in some embodiments, in the accompanying drawings.

BRIEF DESCRIPTION OF THE DRAWINGS

FIG. 4 is a partial perspective view of two flanges being aligned by an exemplary embodiment of the present invention.

FIG. 5 is a side view of two flanges being aligned by an exemplary embodiment of the present invention.

FIG. 6 is a perspective view of two shims provided in an exemplary embodiment of the present invention.

DETAILED DESCRIPTION OF EXEMPLARY EMBODIMENTS

The following discussion describes in detail exemplary embodiments of the invention. This discussion should not be construed, however, as limiting the invention to those particular embodiments. Practitioners skilled in the art will recognize numerous other embodiments as well.

As used herein, the term "flange" refers to each of two generally disk shaped members, having equal diameters and corresponding holes, that are sealably fastened together by placing bolts in each of the pairs of corresponding holes, and then tightening the members by placing nuts on the bolts and tightening the nuts. The flanges are typically welded to pipe sections or valves, with the flange joinder being used to form a connecting joint between the two pipe sections or a pipe section and a valve.

Figure 1:
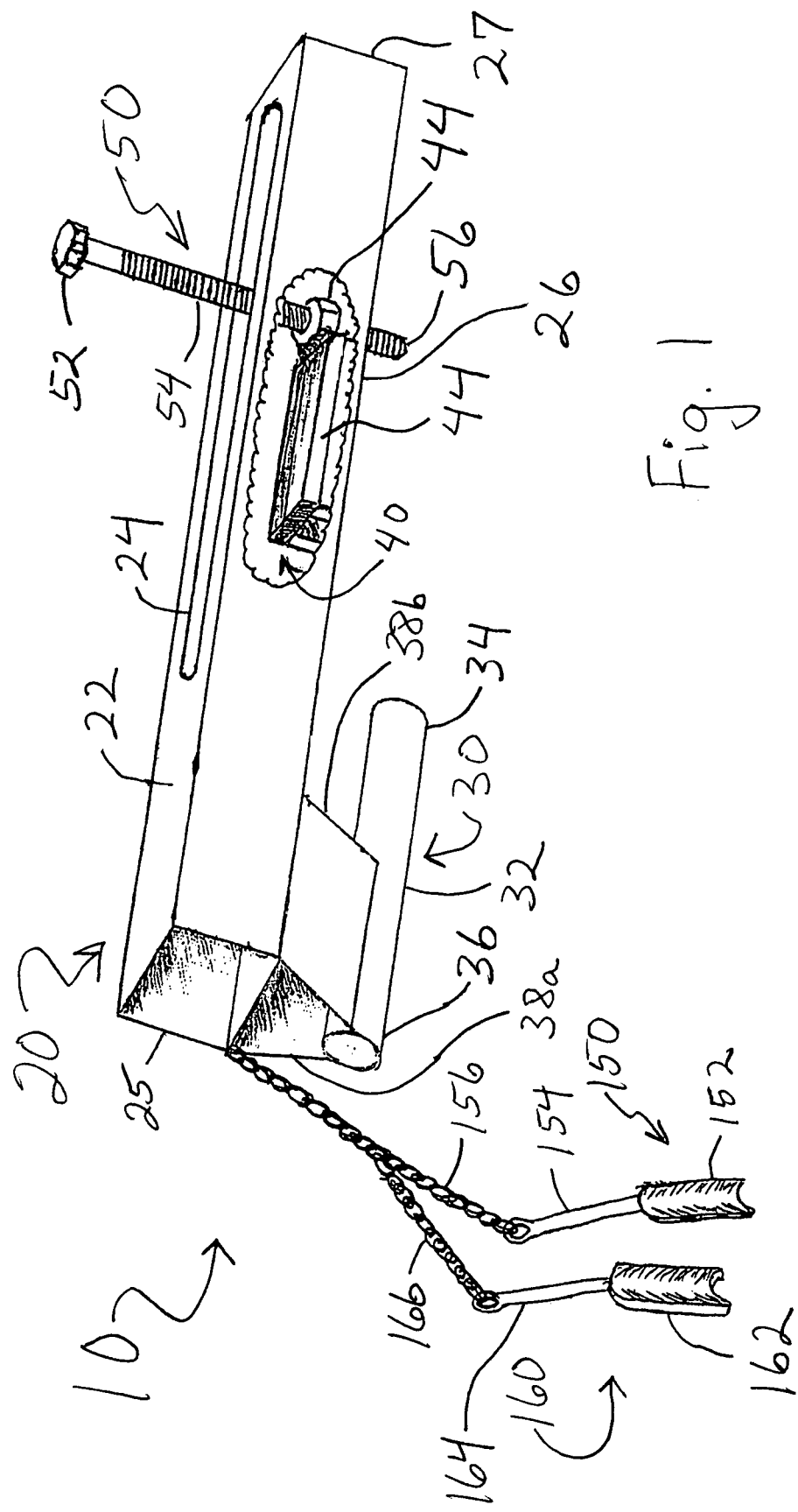
FIG. 1 is a perspective view of an exemplary embodiment of the present invention, with a portion cutaway to illustrate inside components.

Turning now to FIG. 1, wherein an exemplary embodiment of a tool 10 is depicted and shown to comprise a body member 20, an insertion member 30, a sliding member 40, and an elongated member 50. As shown further in FIG. 2, the body member 20 has a top side 22, top side slot 24, first vertical side 25, bottom side 26, second vertical side 27, and bottom side slot 28, and the insertion member 30 has rod 32, a rod first end 34, a rod second end 36, and attachment members 38a,b. The sliding member 40 is shown to comprise a first portion 42 and a second portion 44 having a threaded hole 46, and the elongated member 50 is shown to have a wrenchable first end 52, threads 54 and a second end 56.

Figure 2:
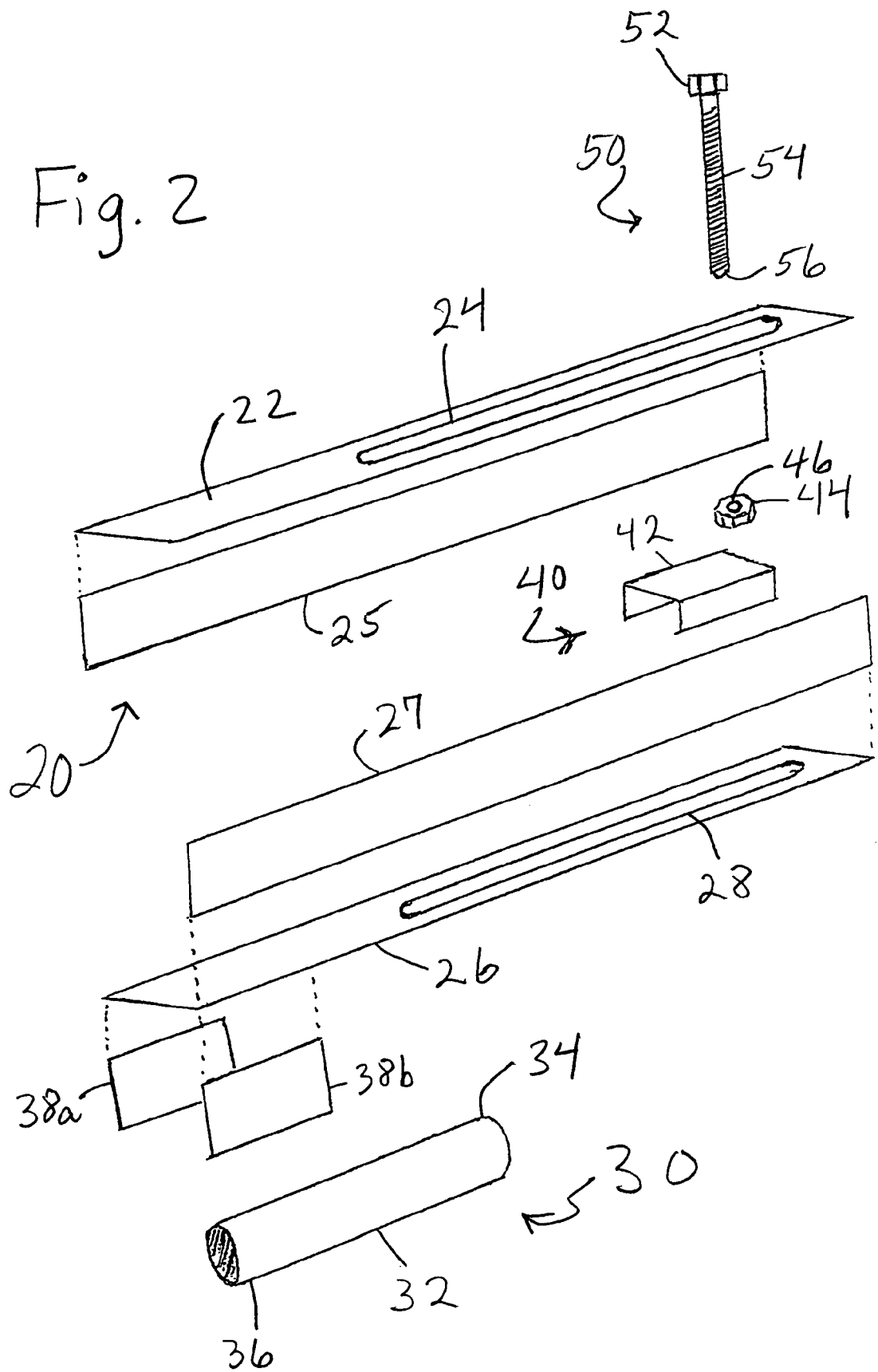
FIG. 2 is a perspective exploded view of an exemplary embodiment of the present invention.
Figure 3:
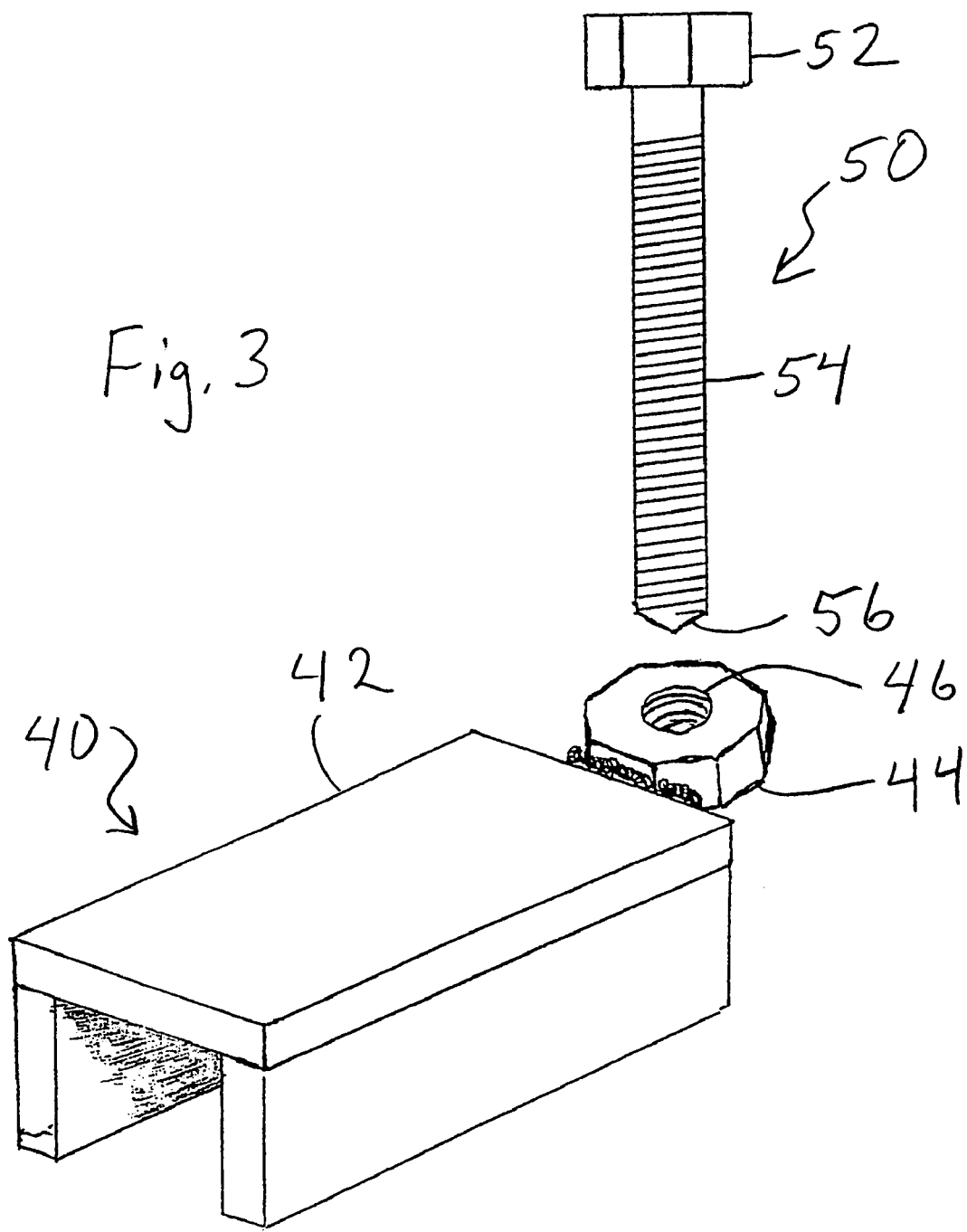
FIG. 3 is a perspective view of the sliding member of an exemplary embodiment of the present invention.

In the exemplary embodiment depicted in FIG. 1 and FIG. 2, the body member 20 is generally rectangular and elongated, and hollow to allow the slide member 40 to slide along at least part of the body member's length, of approximately 11.5 inches. The top side slot 24 and the bottom side slot 28 run generally along a part of the body member length, and are approximately 7.5 inches long, and 0.75 inches wide. As shown further in FIG. 3, the sliding member 40 has a steel, generally rectangular first portion 42, that is approximately 1.25 inches in height, which provides a generally close fit within the body member 20 interior, the interior having a height of approximately 1.5 inches. The sliding member second portion 44, is welded to the first portion, and has a threaded hole 46.

The insertion member 30 in the exemplary embodiment of FIG. 1 is a 1.125 inch steel rod, about 4.5 inches in length. The attachment members 38a,b have a width of about 2.25 inches, and a height of about 1.5 inches, and are welded to both the body member 20 and the insertion member rod 32 such that the height from the top side 22 of the body member 20 to the bottom of the rod 32 is approximately 4.5 inches. The elongated member 50 in this exemplary embodiment is a bolt 50 having a hex head first end 52, threads 54, a second end 56, a diameter of 0.75 inches, and a length of 5.0 inches. When sized according to this exemplary embodiment, the tool 10 can be utilized with flanges having diameters of very large sizes—even 96 inches in diameter.

Turning now to FIG. 4 and FIG. 5, wherein the exemplary embodiment of FIG. 1 is shown in use on a first flange 100 and a second flange 120, the first flange being welded to a first pipe 130, the second flange being welded to a second pipe 140. The first flange 100 has a top hole 102 and an adjacent hole 104, the top hole corresponding to, but misaligned with, a top hole 122 on the second flange 120, the adjacent hole 104 corresponding to, but misaligned with, a hole (not shown) on the second flange.

Turning now to FIG. 6, wherein the exemplary embodiment of FIG. 1, is further shown to include readily accessible primary and secondary shims 150, 160, each shim having an elongated arcuate portion 152, 162 that is sized to generally correspond with different flange hole diameters, with both shims so corresponding to flange hole diameters larger than the diameter of the insertion member rod 32. Each shim has a grasping portion 154,164 and a chain 156,166, the chain being attached to the tool body member 20.

In practice, the misaligned flanges will generally have a first flange 100 that is lower than the second flange 120, this causing the misalignment of the holes through which straight bolts must be inserted to draw the flanges together. In order to raise the first flange 100 such that the flange holes align for bolt insertion, the tool operator inserts the insertion member rod 32 into the top hole 102 of the first flange 100. The rod 32 has a length that, in cooperation with the positioning of the attachment members 38a,b, prevents the rod second end 36 from extending, to any significant length, beyond hole 102. The attachment members 38a,b are sized such that the body member 20 easily extends over the first flange 100, thus placing at least a portion of the lengths of the body member top side slot 24 and bottom side slot 28 over the top edge 124 of the second flange 120.

At this point, the tool operator inspects the fit of the insertion member rod 32 in the first flange top hole 102. As shown in FIG. 4, when the hole diameter substantially exceeds the rod diameter, the operator will insert either or both of the shims 150,160 into the hole 102 along with the rod second end 36. In FIG. 4, the primary shim 150 is adjacent the rod and the secondary shim is adjacent the hole 102, thus positioning the widest arcuate portion 162 against the wall of the flange hole 102.

Having further secured the insertion member rod 32 in the first flange top hole 102, using the shims 150,160, the operator then slides the sliding member 40 until the bolt 50 is positioned above the second flange top edge 124. Using a wrench, or other suitable tool, the operator begins to rotate the bolt at the bolt head 52. As the bolt is rotated clockwise its threads 54 act in cooperation with the threads in the sliding member second portion hole 46, allowing the bolt second end 56 to emerge from the body member bottom side slot 28 and continue downwardly until the bolt second end bears upon the second flange top edge 124. Because of the generally close fit of the sliding member first portion 42 in the body member 20, the continued rotation of the bolt 50 causes the sliding member 40 to push upwardly on the body member top side 22, thus raising the body member, and, in turn, raising the insertion member rod 32. As the insertion member rod 32 is elevated, it bears on the first flange 100 and supports and raises the first flange at the flange top hole. The operator continues to rotate the bolt 50 until visual inspection indicates that the top edges of the flanges are substantially flush, at which time the operator inserts a flange bolt into a first flange 100 hole (such as hole 104) which can readily continue into and through the corresponding hole on the second flange 120, because of the new alignment of such holes due to the elevation of the first flange.

Although an exemplary embodiment of the tool of the present invention has been described herein with dimensions suitable for the application depicted in FIGS. 1-6, and for applications involving very large flange diameters, it will be clear to a person of ordinary skill in the art, that the components of the tool, can be re-sized to fit flanges of substantially smaller and larger diameters. Similarly, additional shims, of varying sizes, can be provided to accommodate a range of flange hole diameters.

With respect to the above description then, it is to be realized that the optimum materials and configuration for my device will occur to those skilled in the art upon review of the present disclosure.

All equivalent relationships to those illustrated in the drawings and described in the specification are intended to be encompassed by the present invention.

The descriptions in this specification are for purposes of illustration only and are not to be construed in a limiting sense.

I claim:

1. A tool for aligning misaligned bolt holes in first and second flanges, the flanges having top edges and holes, including top holes, for receiving bolts, such that the first and second flanges can be drawn together, the tool comprising:
   an insertion member for inserting into the top hole of the first flange;
   a body member, attached to the insertion member, for positioning on the second flange and extending over the first flange;
   a sliding member slidably positioned within the body member; and
   an elongated member positioned through the body member, threadably received by the sliding member, and slidable along the body member with the sliding member to a point above the second flange top edge, such that rotation of the elongated member in a first direction causes the elongated member to bear upon the second flange top edge and move the body member, the movement of the body member causing the insertion member to move the first flange toward a more aligned position.

2. The tool of claim 1, further comprising a shim for reducing the annulus formed by the insertion member in the first flange top hole.

3. The tool of claim 2, further comprising an attachment member for attaching the shim to the tool.

4. The tool of claim 1, further comprising a plurality of shims, having varying thicknesses, for reducing the annulus formed by the insertion member in the first flange top hole.

5. The tool of claim 4, further comprising an attachment member for attaching the shim to the tool.

6. The tool of claim 1, wherein the first flange top hole has an interior end and the insertion member has a first end, and further wherein the body member and insertion member are configured such that, when inserted into the first flange top hole, the body member bears upon the first flange and the insertion member first end is proximate the first flange top hole interior end.

7. A tool for aligning misaligned bolt holes in first and second flanges, the flanges having top edges and holes, including top holes, for receiving bolts, such that the first and second flanges can be drawn together, the tool comprising:
   a body member, the body member having a bore, a top and a bottom, the top having a slot, the bottom having a slot, the top and bottom slots being at least partially aligned;
   a rod, attached to the body member, the rod being in substantial parallel alignment with the top slot; and
   a slide member, positioned for movement along the body member bore, the sliding member having a threaded member, the sliding member having a hole for threadably receiving the threaded member, the threaded member being positioned through the body member top slot, through the sliding member hole, then through the body member bottom slot;
   such that, when the rod is inserted into the first flange top hole, the body member extends over the second flange top edge, and rotation of the threaded member causes the body member to rise and lift the rod, the rod lifting the second flange.

8. The tool of claim 7, further comprising a shim for reducing the annulus formed by the rod in the first flange top hole.

9. The tool of claim 8, further comprising an attachment member for attaching the shim to the tool.

10. The tool of claim 7, further comprising a plurality of shims, having varying thicknesses, for reducing the annulus formed by the rod in the first flange top hole.

11. The tool of claim 10, further comprising an attachment member for attaching the shim to the tool.

12. The tool of claim 7, wherein the first flange top hole has an interior end and the rod has a first end, and further wherein the body member and rod are configured such that, when inserted into the first flange top hole, the body member bears upon the first flange and the rod first end is proximate the first flange top hole interior end.

* * * * *